United States Patent [19]
Kajiwara et al.

[11] Patent Number: 5,896,941
[45] Date of Patent: Apr. 27, 1999

[54] SUSPENSION SYSTEM FOR STEERED WHEELS IN VEHICLE

[75] Inventors: Hajime Kajiwara; Yasuji Shibahata, both of Wako, Japan

[73] Assignee: Honda, Giken Kogyo Kabushiki Kaisha, Tokyo, Japan

[21] Appl. No.: 08/747,089

[22] Filed: Nov. 13, 1996

[30] Foreign Application Priority Data

Nov. 14, 1995 [JP] Japan .................................. 7-295764

[51] Int. Cl.$^6$ ................................................ B60K 17/16
[52] U.S. Cl. ............................ 180/76; 180/253; 280/552
[58] Field of Search .................................. 280/675, 5.52; 180/253, 76

[56] References Cited

U.S. PATENT DOCUMENTS

| | | | |
|---|---|---|---|
| 4,162,712 | 7/1979 | Nelson | 180/253 |
| 4,440,420 | 4/1984 | Müller | 280/675 |
| 4,819,959 | 4/1989 | Inoue et al. | 280/675 |
| 4,863,188 | 9/1989 | Killian | 280/675 |
| 5,372,377 | 12/1994 | Lee | 280/675 |
| 5,415,427 | 5/1995 | Sommerer et al. | 280/675 |

FOREIGN PATENT DOCUMENTS

| | | |
|---|---|---|
| 0 457 296 A2 | 11/1991 | European Pat. Off. . |
| 857359 | 9/1940 | France . |
| 3147787 A1 | 9/1983 | Germany . |

*Primary Examiner*—Kenneth R. Rice
*Attorney, Agent, or Firm*—Armstrong, Westerman, Hattori, McLeland & Naughton

[57] ABSTRACT

A suspension system for the steered wheels of a vehicle include knuckles, the lower portions of which are pivotally supported at tip ends of a lower arm and a radius rod through two ball joints. Each of the steered wheels is steered about a phantom king pin axis passing through an intersection a of extensions of the lower arm and the radius rod so that, during clockwise turning of the vehicle, the point a of an outer wheel during turning of the vehicle is little moved, but the point a of an inner wheel during turning of the vehicle is moved inwards of a vehicle body through a distance $\alpha_R$ whereby a distance between a ground point of the inner wheel and the phantom king pin axis is larger than a distance between a ground point of the outer wheel and the phantom king pin axis and, hence, left and right steering moments generated by driving forces of the left and right steered wheels are countervailed with each other, whereby the generation of unnecessary steering moments is prevented as a whole.

5 Claims, 11 Drawing Sheets

SUSPENSION SYSTEM FOR STEERED WHEELS IN VEHICLE

BACKGROUND OF THE INVENTION

1. Field of the Invention

The present invention relates to a suspension system for steered wheels in a vehicle, and particularly to a steering wheel suspension system which is capable of distributing different driving forces or braking forces to the left and right steered wheels suspended by left and right suspensions.

2. Description of the Related Art

Figure 11:
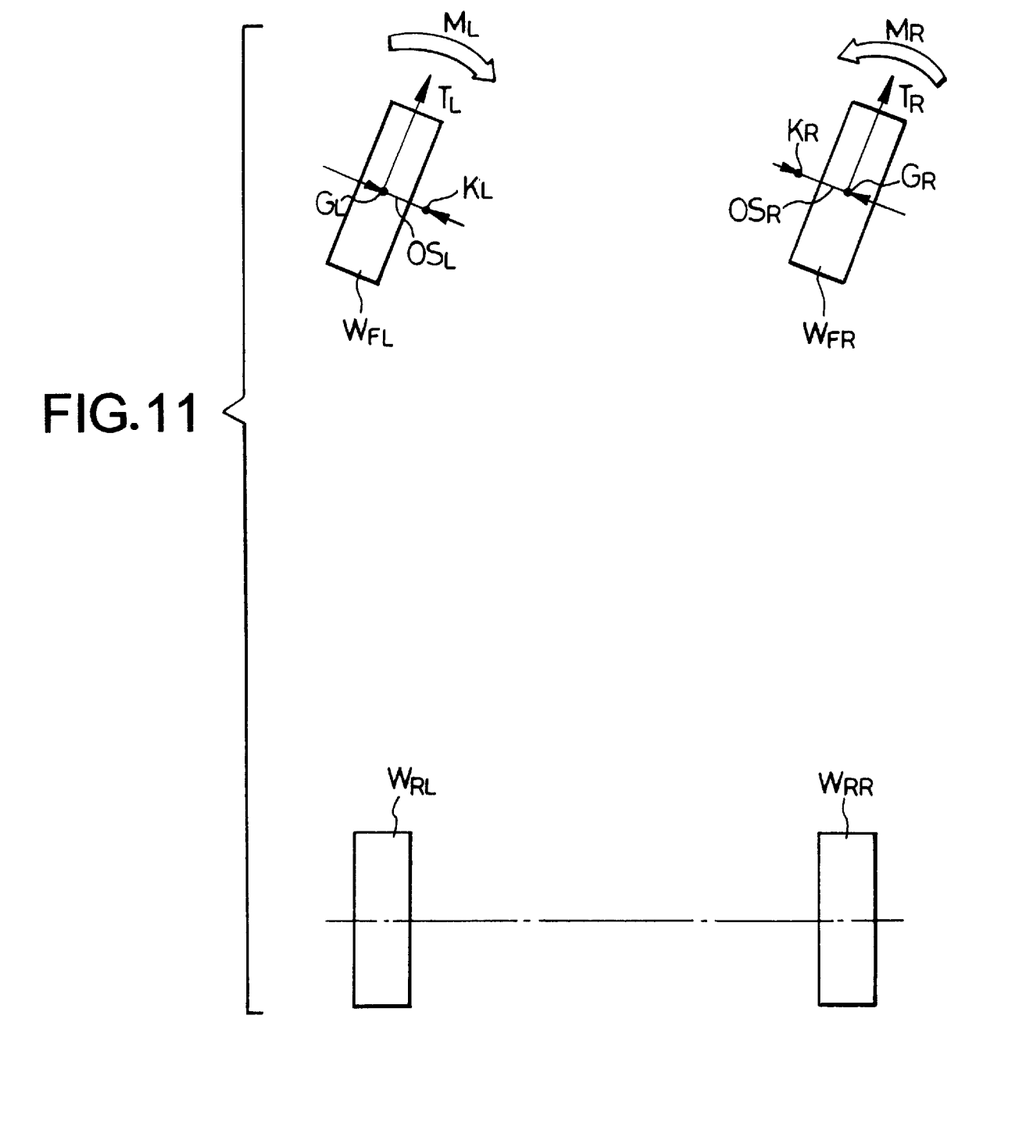
FIG. 11 is an illustration for explaining a steering torque applied to steered wheels during turning of the vehicle.

FIG. 11 diagrammatically shows a vehicle having a front engine and front drive which is being turned. King pin axes $K_L$ and $K_R$, which are steering centers of left and right steered wheels $W_{FL}$ and $W_{FR}$ that are driven wheels, are offset inwards of a vehicle body with respect to ground points $G_L$ and $G_R$ of the left and right steered wheels $W_{FL}$ and $W_{FR}$. Therefore, center offsets $OS_L$ and $OS_R$ exist between the king pin axes $K_L$ and $K_R$ and the ground points $G_L$ and $G_R$. If driving forces $T_L$ and $T_R$ of the engine are applied to the left and right front wheels $W_{FL}$ and $W_{FR}$, a moment $M_L$ ($M_L = T_L \times OS_L$) intending to steer the left front wheel $W_{FL}$ in a clockwise direction (a turning direction) about the king pin axis $K_L$ is applied to the left front wheel $W_{FL}$, which is an outer wheel during turning of the vehicle, and a moment $M_R$ ($M_R = T_R \times OS_R$) intending to steer the right front wheel $W_{FR}$ in a counterclockwise direction (a direction opposite from the turning direction) about the king pin axis $K_R$ is applied to the right front wheel $W_{FR}$, which is an inner wheel during turning of the vehicle.

However, in the conventional front engine and front drive vehicle, the driving force of the engine is distributed equally to the left and right front wheels $W_{FL}$ and $W_{FR}$ through a differential. Moreover, the left and right center offsets $OS_L$ and $OS_R$ are set equally to each other and, hence, the steering moment $M_L$ for the left front wheel $W_{FL}$, which is the outer wheel during turning of the vehicle, is balanced with the steering moment $M_R$ for the right front wheel $W_{FR}$, which is the inner wheel during turning of the vehicle. Therefore, there is no problem in that a steering wheel is not unintentionally turned outwards or inwards during turning of the vehicle because of the steering moments $M_L$ and $M_R$.

In a vehicle in which, for example, in clockwise turning of the vehicle, a larger driving force $T_L$ is distributed to a left front wheel $W_{FL}$, which is an outer wheel during turning of the vehicle, and a smaller driving force $T_R$ is distributed to a right front wheel $W_{FR}$, which is an inner wheel during turning of the vehicle, in order to enhance the turning performance of the vehicle, the steering moment ($M_L = T_L \times OS_L$) for the outer wheel is larger when the steering moment ($M_L = T_R \times OS_R$) for the inner wheel, resulting in a problem of the generation of a so-called, "counter-action" phenomenon of steering wheel, in which the steering wheel is unintentionally turned inwards of the direction of turning of the vehicle due to a difference between the steering moments $M_L$ and $M_R$.

SUMMARY OF THE INVENTION

Accordingly, it is an object of the present invention to provide means to previously prevent the generation of the "counter-action" phenomenon of the steering wheel of the vehicle in which different driving forces or braking forces can be distributed to the left and right steered wheels.

To achieve the above object, according to a first aspect and feature of the present invention, there is provided a suspension system for steered wheels in a vehicle in which different driving forces or braking forces can be distributed to left and right steered wheels that are suspended by left and right suspensions, wherein each of the suspensions includes at least two independent suspension arms, each of which is pivotally supported at its one end to a vehicle body and, at the other end, on a knuckle, and each of the steered wheels can be steered about a phantom king pin axis passing through an intersection of extensions of the two independent suspension arms.

With regard to the first feature of the present invention, center offsets can be set at small values while avoiding an interference of the suspension arms with wheel rims of the steered wheels, thereby minimizing the generation of a steering moment due to the driving forces or braking forces for the steered wheels. In addition, the center offsets can be varied with regard to the steering of the steered wheels to freely control the amount of steering moment generated due to the driving forces or braking forces for the steered wheels.

According to a second aspect and feature of the present invention, in addition to the first feature, when distances between ground points of said steered wheels and points of projection onto a road surface of intersections of said phantom king pin axes of the steered wheels with axles, as viewed in a longitudinal direction, are defined as center offsets, said center offsets are set such that said center offset of an outer wheel during turning of the vehicle is smaller than said center offset of an inner wheel during turning of the vehicle, when said steered wheels are being steered.

With regard to the second feature, even if a larger driving force or braking force is distributed to the outer wheel during turning of the vehicle and a smaller driving force or braking force is distributed to the inner wheel during turning of the vehicle in order to enhance the turning performance, steering moments of the outer and inner wheels during turning of the vehicle due to the driving or braking forces can be effectively countervailed with each other, whereby the generation of steering moments can be avoided as a whole.

According to a third aspect and feature of the present invention, in addition to the second feature, a point of connection between a knuckle and one of the two independent suspension arms having a larger inclination angle ($\theta_2$) with respect to the center line of a vehicle body is disposed in the vehicle body at an inner location than a point of connection between the knuckle and the other suspension arm having a smaller inclination angle ($\theta_1$) with respect to the center line of the vehicle body.

With regard to the third feature of the present invention, the center offset of the outer wheel during turning of the vehicle can be set smaller than the center offset of the inner wheel during turning of the vehicle by a simple structure.

The above and other objects, features and advantages of the invention will become apparent from the following description of a preferred embodiment taken in conjunction with the accompanying drawings.

DETAILED DESCRIPTION OF THE PREFERRED EMBODIMENT

The present invention will now be described by way of preferred embodiments with reference to the accompanying drawings.

Figure 1:
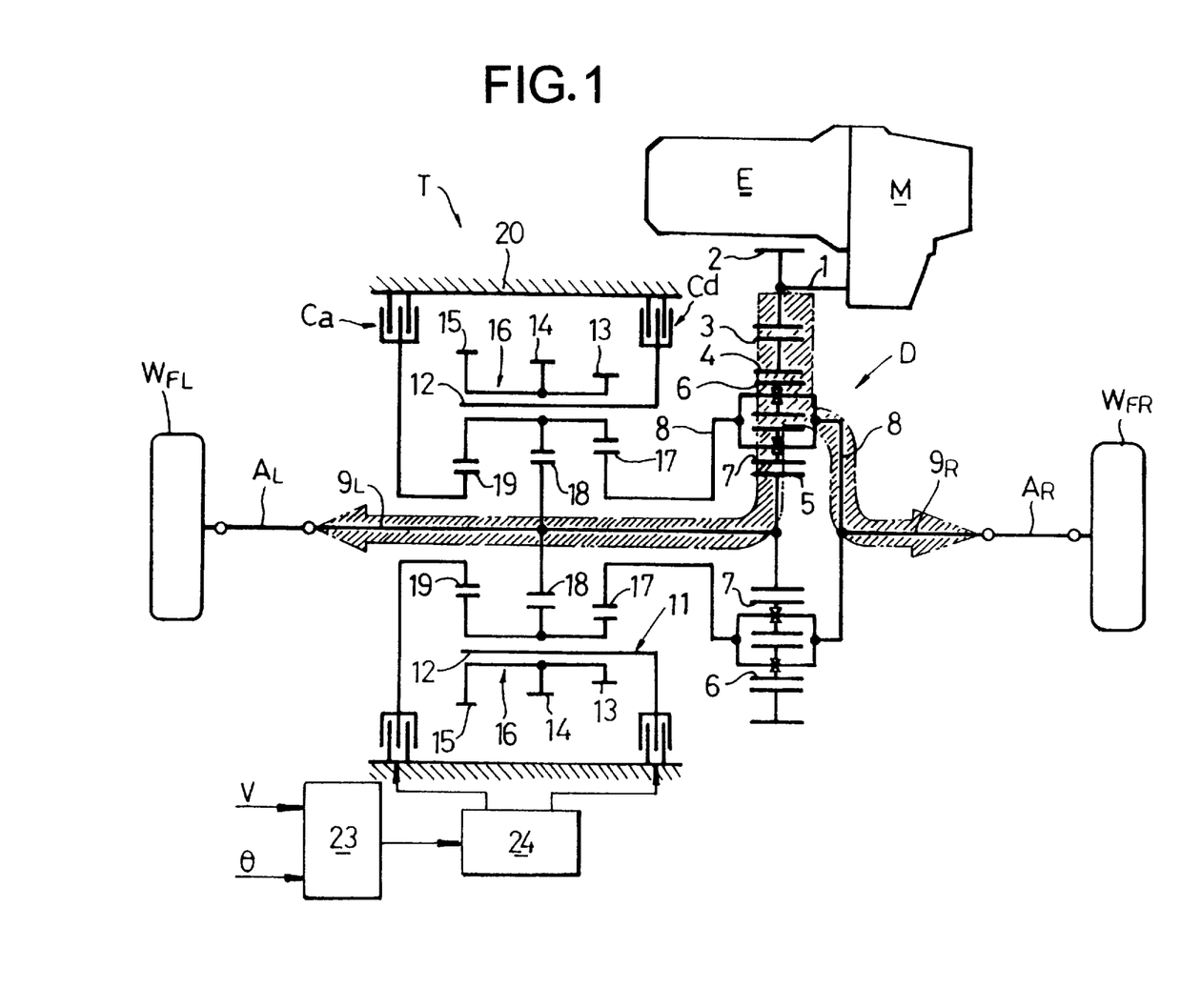
FIG. 1 is a skeleton illustration of a power transmitting system of a front engine and front drive vehicle.

Referring to FIG. 1, a transmission M is connected to a right end of an engine E which is horizontally mounted at a front portion of a vehicle body, and a torque transmitting means T is disposed in the rear of the engine E and the transmission M. A left front wheel $W_{FL}$ and a right front wheel $W_{FR}$, which are driven wheels and steered wheels, are connected to a left drive axle $A_L$ and a right drive axle $A_R$ which extend leftwards and rightwards from a left end and a right end of the torque transmitting means T, respectively.

The torque transmitting means T includes a differential D to which a driving force is transmitted from an external tooth gear 3 meshed with an input gear 2 which is mounted on an input shaft 1 extending from the transmission M. The differential D includes a ring gear 4 including a double pinion type planetary gear mechanism and integral with the external tooth gear 3, a sun gear 5 coaxially disposed within the ring gear 4, and a planetary carrier 8 which carries an outer planetary gear 6 meshed with the ring gear 4 and an inner planetary gear 7 meshed with the sun gear 5 in a state in which the outer and inner planetary gears 6 and 7 are meshed with each other. In the differential D, the ring gear 4 functions as an input element, and the sun gear 5, functioning as one of the output elements, is connected to the left front wheel $W_{FL}$ through a left output element $9_L$. In addition, the planetary carrier 8, functioning as the other output element, is connected to the right front wheel $W_{FR}$ through a right output shaft $9_R$.

A carrier member 11 is rotatably supported around an outer periphery of the left output shaft $9_L$ and includes four pinion shafts 12 which are disposed at circumferentially spaced-apart distances of 90°. Triple-pinion members 16, each having first, second and third pinions 13, 14 and 15 integrally formed thereon, are rotatably supported on pinion shafts 12, respectively. The number N of the triple-pinion members 16 is four, but is not limited to four and may be two or more (N=2, 3, 4, 5, 6, - - - ).

A first sun gear 17 is rotatably carried around the outer periphery of the left output shaft $9_L$ and meshed with the first pinion 13. The first sun gear 17 is connected to the planetary carrier 8 of the differential D. A second sun gear 18 is fixed to the outer periphery of the left output shaft $9_L$ and meshed with the second pinion 14. Further, a third sun gear 19 is rotatably carried on the outer periphery of the left output shaft $9_L$ and meshed with the third pinion 15.

The numbers of teeth of the first, second and third pinions 13, 14, and 15 and the first, second and third sun gears 17, 18 and 19 are as follows:

Number $Z_2$ of teeth of the first pinion 13=17

Number $Z_4$ of teeth of the second pinion 14=17

Number $Z_6$ of teeth of the third pinion 15=34

Number $Z_1$ of teeth of the first sun gear 17=32

Number $Z_3$ of teeth of the second sun gear 18=28

Number $Z_5$ of teeth of the third sun gear 19=32

If modules of the first pinion 12 and the first sun gear 17 meshed with each other are identical to each other, modules of the second pinion 14 and the second sun gear 18 are identical to each other, and modules of the third pinion 14 and the third sun gear 18 are identical to each other, but it is not required that the modules of the first, second and third pinions 13, 14 and 15 and the first, second and third sun gears 17, 18 and 19 be all identical to each other.

Figure 2A:
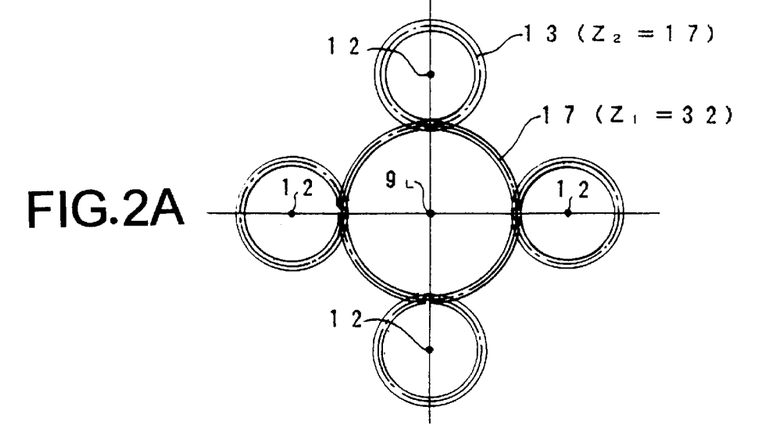
FIGS. 2A to 2C are diagrams illustrating the relationship between the numbers of teeth of each of pinions and a sun gear.
Figure 2B:
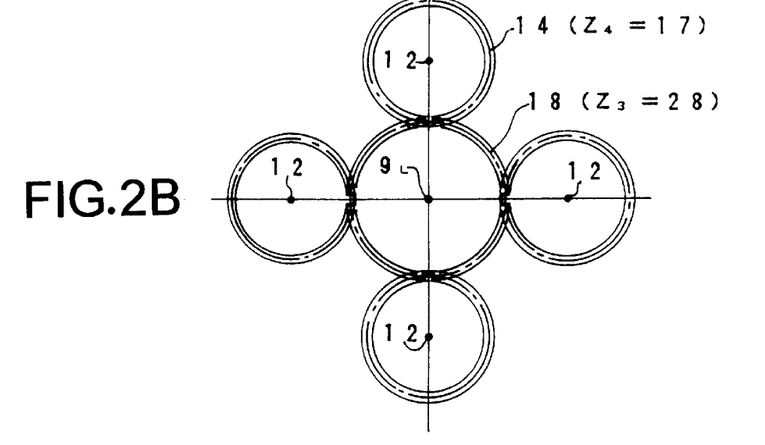
Figure 2C:
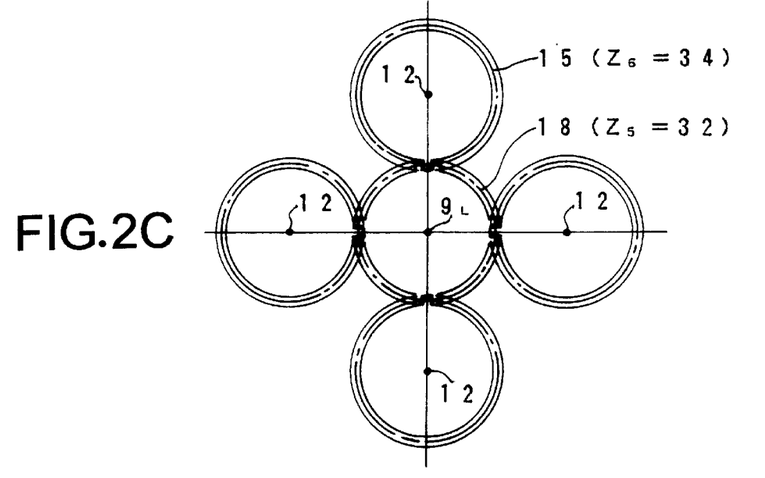

As can be appreciated from FIGS. 2A to 2C, the numbers of teeth of the first, second and third pinions 13, 14 and 15 can be set at any of M, 2M, 3M, 4M, 5M,—wherein M is a minimum number of teeth of each of them. In the embodiment, the minimum numbers of teeth are set such that the minimum numbers M of the first and second pinions 13 and 14 are equal to 17, and the minimum number of the third pinion 15 satisfies 2M=34.

The numbers of teeth of the first, second and third sun gears 17, 18 and 19 are set, based on the number N of the triple-pinion members 16, at any of N, 2N, 3N, 4N, 5N,— which are multiples of N. In the embodiment, N=4, and the numbers of teeth of the first and third sun gears 17 and 19 is set at 8N=32, and the number of teeth of the second sun gear 18 is set at 7N=28.

The third sun gear 19 is capable of being coupled to a casing 20 through a speed-increasing clutch Ca, and the number of rotations of the carrier member 11 is increased by the engagement of the speed-increasing clutch Ca. The carrier member 11 is capable of being coupled to the casing 20 through a speed-reducing clutch Cd, and the number of rotations of the carrier 11 is reduced by the engagement of the speed-reducing clutch Cd.

The speed-reducing hydraulic clutch Cd and the speed-increasing hydraulic clutch Ca are controlled through a hydraulic circuit 24 by an electronic control unit 23 to which a vehicle speed V and a steering angle θ are inputted.

The structure of a suspension S for the left front wheel $W_{FL}$ will be described below with reference to FIGS. 3 to 6. The structure of a suspension S for the right front wheel $W_{FR}$ is mirror-symmetric with that for the left front wheel $W_{FL}$ and, hence, the repeated description thereof is omitted.

Figure 3:
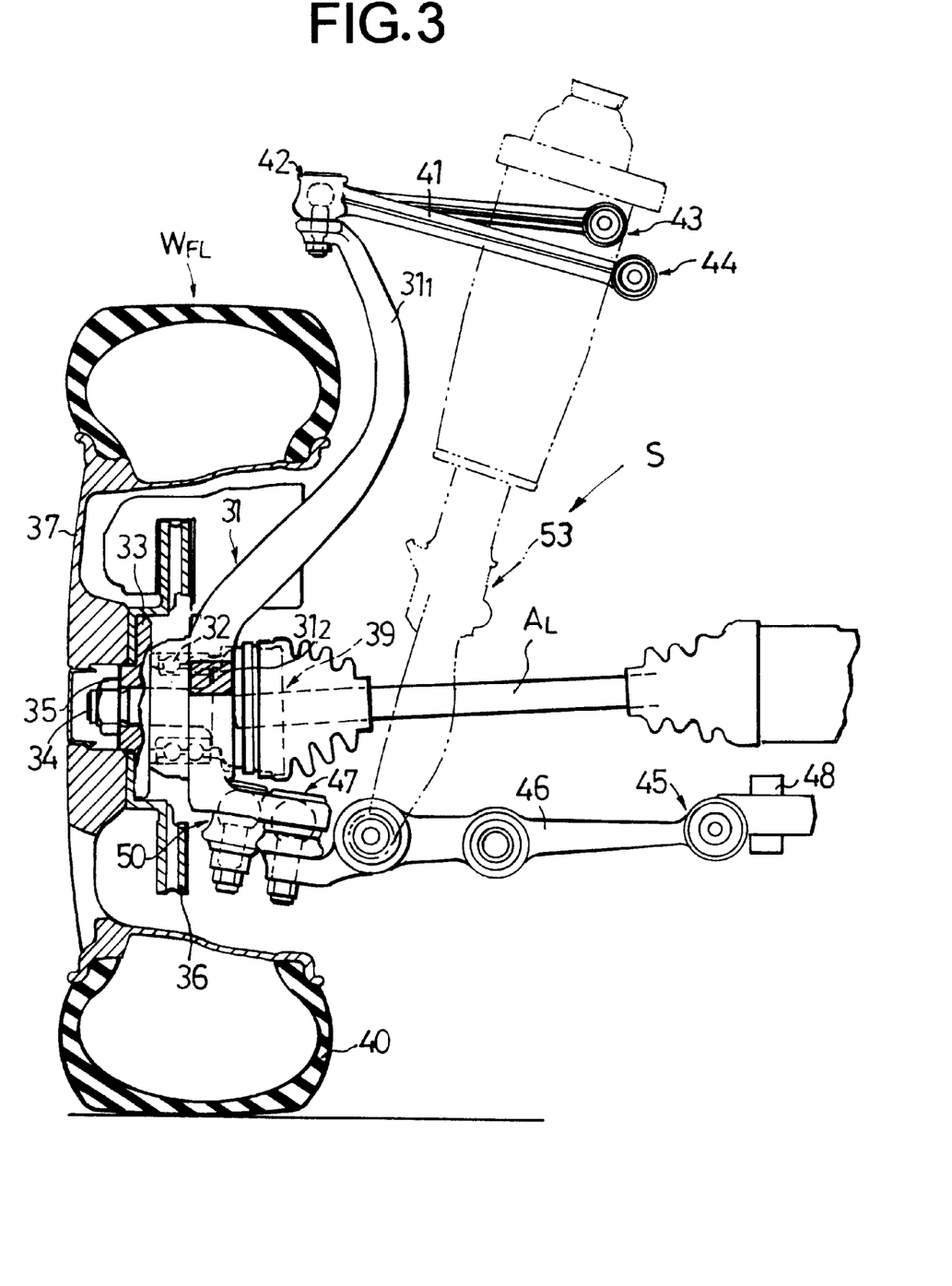
FIG. 3 is a rear view of a suspension for a left front wheel.
Figure 4:
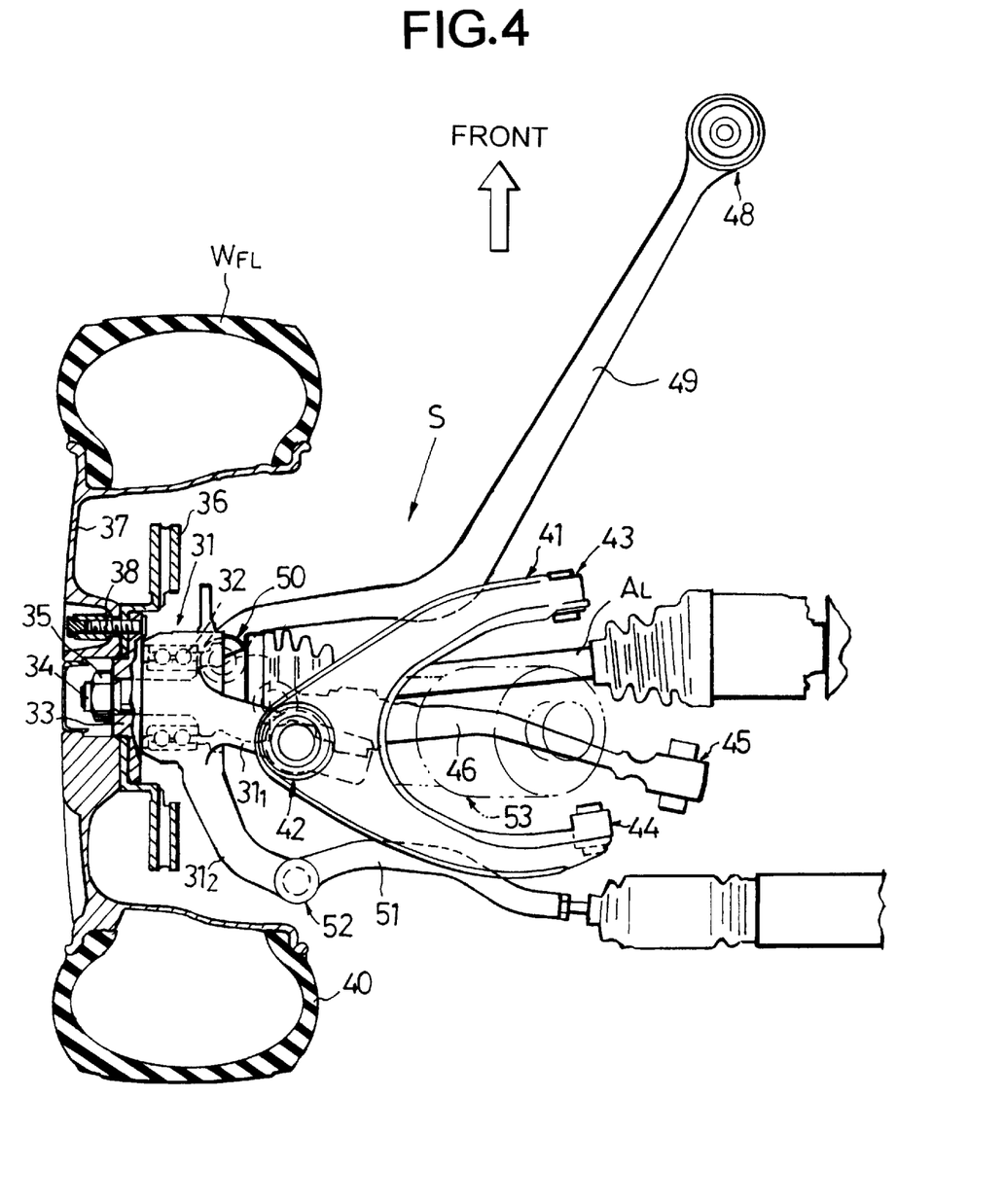
FIG. 4 is a plan view of the suspension for the left front wheel.

A hub 33 is rotatably carried on a knuckle 31 through a ball bearing 32. An axle 34 is fixed to the center of the hub 33 by a nut 35, and a brake disk 36 and a wheel 37 are commonly clamped to an outer periphery of the hub 33 by bolts 38. A laterally outer end of the left drive axle $A_L$ is connected to a laterally inner end of the axle 34 through a universal joint 39, such that the rotation of the left drive axle $A_L$ is transmitted through the universal joint 39, the axle 34, the hub 33, the brake disk 36 and the wheel 37 to a tire 40.

An upper arm 41, formed into a bifurcated shape, is pivotally supported at its tip end on an upper end of an arm $31_1$ extending upwards from the knuckle 31 through an upper arm ball joint 42. The bifurcated base ends of the upper arm 41 are pivotally supported on the vehicle body through two rubber bush joints 43 and 44.

A lower arm 46 is pivotally supported at its base end on the vehicle body through a rubber bush joint 45 and its tip end on a lower portion of the knuckle 31 through a lower arm ball joint 47. A radius rod 49 is pivotally supported at is base end on the vehicle body through a rubber bush joint 48 and at its tip end on the lower portion of the knuckle 31 through a radius rod ball joint 50. The lower arm 46 is disposed substantially horizontally, and the radius rod 49 is disposed in an inclined attitude, such that the base end thereof is located at a front portion of the vehicle body and the tip end thereof is located in a direction of the vehicle body. Namely, the radius rod 49 has an inclination angle $\theta_1$ with respect to the center line of the vehicle body, and the lower arm 46 has a large inclination angle $\theta_2$ with respect to the center line of the vehicle body. The lower arm ball joint 47 interconnecting the lower arm 46 and the knuckle 31 is disposed at that point in the vehicle body which is inner (near the center line of the vehicle body) than the radius rod ball joint 50 interconnecting the radius rod 49 and the knuckle 31 by a distance L (see FIG. 6).

Further, a tie rod 51 connected to a steering wheel is connected through a ball joint 52 to a tip end of arm $31_2$ extending rearwards from the knuckle 31, and an intermediate portion of the lower arm 46 and the vehicle body are interconnected by a damper 53.

Figure 5:
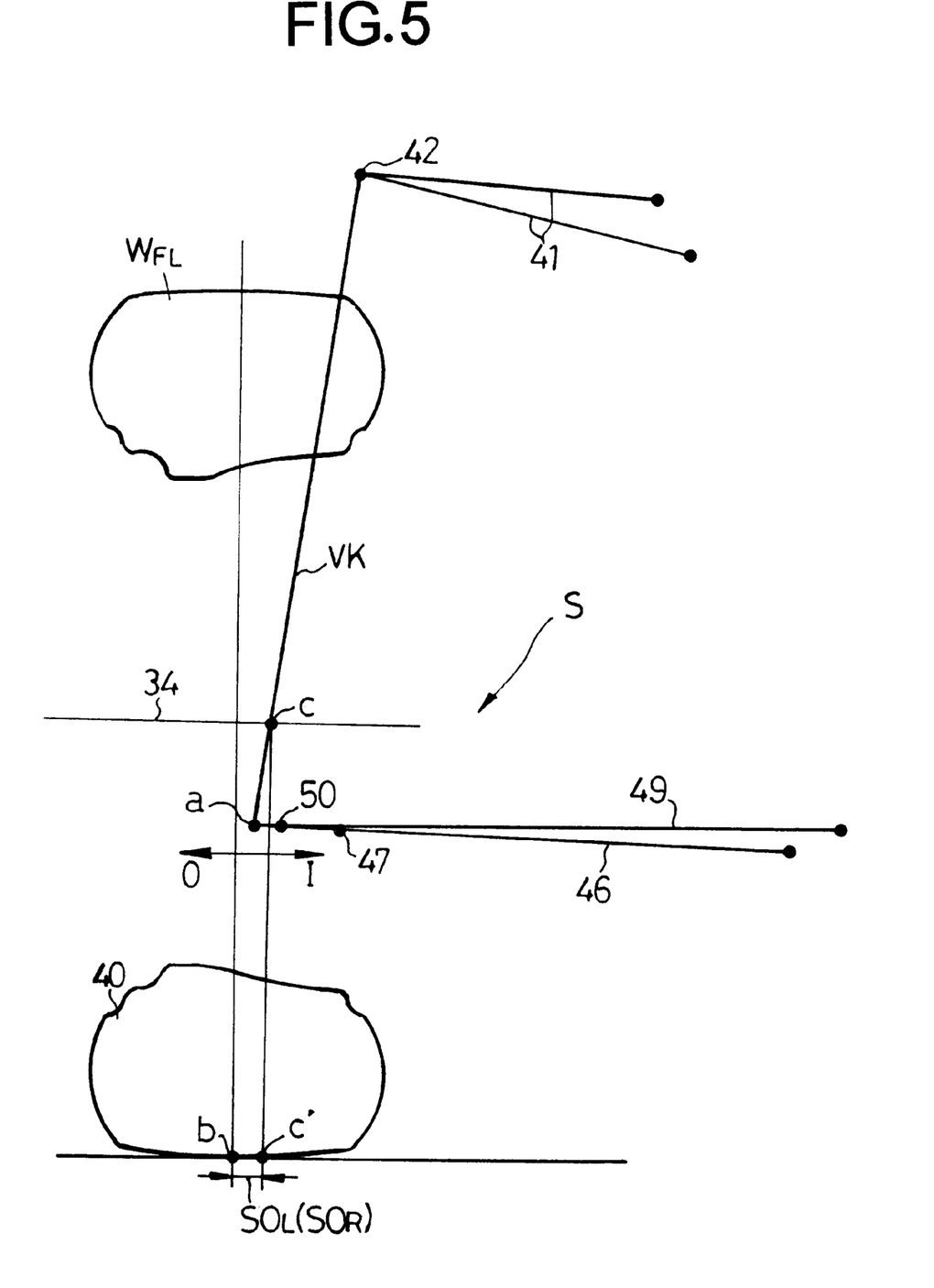
FIG. 5 is a diagrammatic illustration corresponding to FIG. 3.
Figure 6:
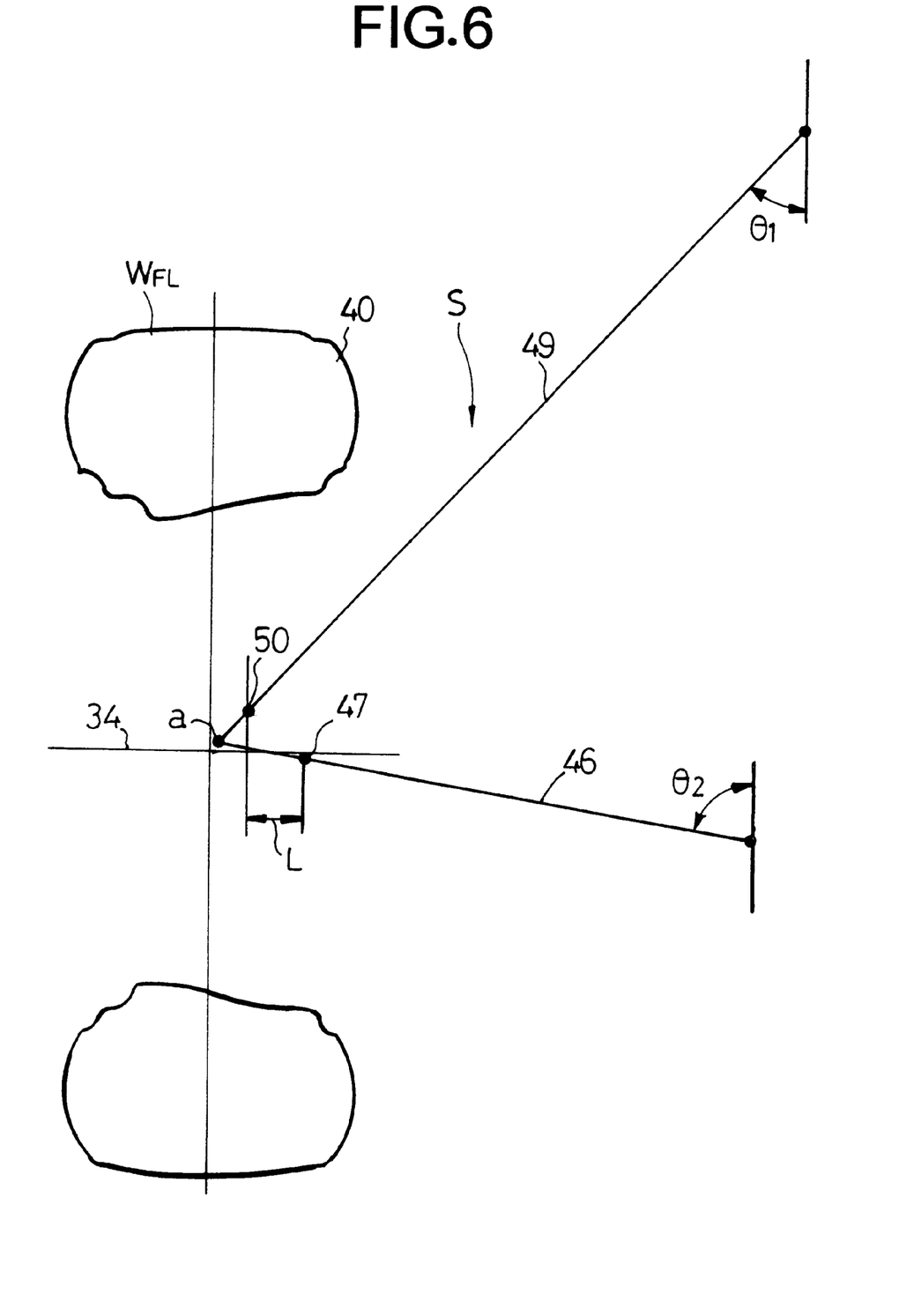
FIG. 6 is a diagrammatic illustration corresponding to FIG. 4.

As can be seen from FIG. 5, in a state in which the left front wheel $W_{FL}$ is viewed in a longitudinal direction, a phantom king pin axis VK is formed to pass through the upper arm ball joint 42 at the tip end of the upper arm 41 and an intersection a of an extension of the lower arm 46 with an extension of the radius rod 49, and the left front wheel $W_{FL}$ is steered about the phantom kin pin axis VK. If a ground point of the tire 40 is represented by b, an intersection of the phantom king pin axis VK and the axle 34 is by c and a point of projection of the point c onto a road surface is by c', a distance between the point b and the point c' is defined as a center offset $OS_L$. If a driving force $T_L$ is applied to the ground point b of the tire 40, a steering moment $M_L$ ($M_L = T_L \times OS_L$) about the phantom king pin axis VK is applied to the left front wheel $W_{FL}$. Likewise, a steering moment $M_R$ ($M_R = T_R \times OS_R$) about the phantom king pin axis VK is applied to the right front wheel $W_{FR}$.

The operation of the embodiment of the present invention having the above-described construction will be described below.

During straight traveling of the vehicle, both of the speed-reducing hydraulic clutch Cd and the speed-increasing hydraulic clutch Ca are brought into non-engaged states. Thus, the restriction of the carrier member 11 and the third sun gear 19 are released, thereby permitting all of the left axle $9_L$, the right axle $9_R$, the planetary carrier 8 of the differential D and the carrier member 11 to be rotated together. During this time, a torque of the engine E is transmitted from the differential D equally to the left and right front wheels $W_{FL}$ and $W_{FR}$, as shown by an obliquely lined arrow in FIG. 1.

Figure 7:
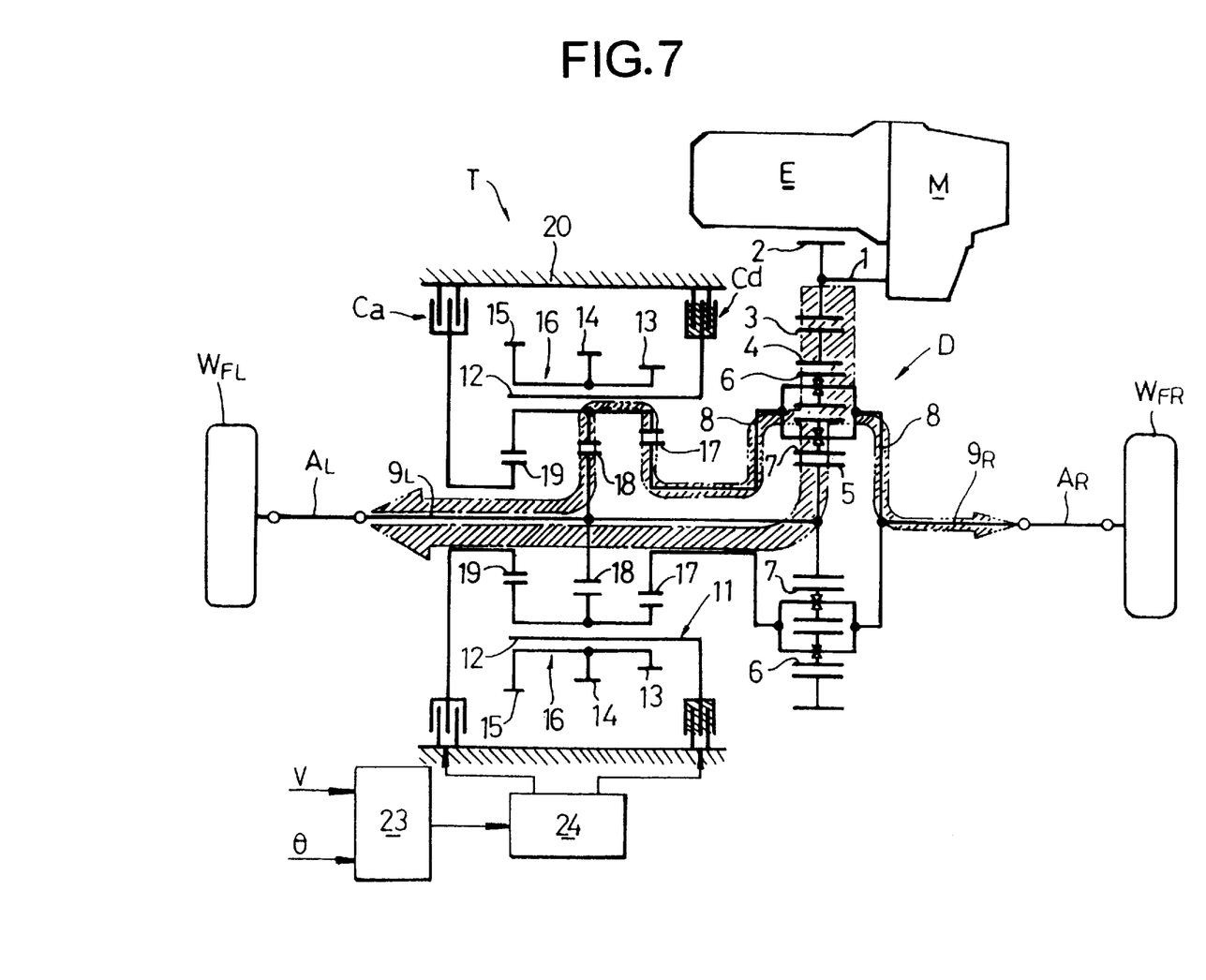
FIG. 7 is an illustration for explaining the operation of the power transmitting system of FIG. 1 during clockwise turning of the vehicle.

During clockwise turning of the vehicle, the speed-reducing hydraulic clutch Cd is brought into the engaged state through the electronic control unit 23 and the hydraulic circuit 24, as shown in FIG. 7, thereby coupling the carrier member 11 to the casing 20 to stop the carrier member 11. At this time, the left output shaft $9_L$ integral with the left front wheel $W_{FL}$ and the right output shaft $9_R$ integral with the right front wheel $W_{FR}$ (and thus, the planetary carrier 8 of the differential D) are in states that they are connected to each other through the second sun gear 18, the second pinion 14, the first pinion 13 and the first sun gear 17 and, hence, the number $N_L$ of rotations of the left front wheel $W_{FL}$ is increased in a relation represented by the following equation relative to the number of rotations of the right front wheel $W_{FR}$.

$$N_L/N_R = (Z_4/Z_3) \times (Z_1/Z_2) = 1.143 \qquad (1)$$

If the number $N_L$ of rotations of the left front wheel $W_{FL}$ is increased in the above manner relative to the number of rotations of the right front wheel $W_{FR}$, a portion of the torque of the right front wheel $W_{FR}$, which is an inner wheel during turning of the vehicle, can be transmitted to the left front wheel $W_{FL}$, which is an outer wheel during turning of the vehicle, as shown by the obliquely lined arrow in FIG. 7.

If the engage force of the speed-reducing hydraulic clutch Cd is properly regulated to reduce the number of rotations of the carrier member 11 in place of stopping of the carrier member 11 by the speed-reducing hydraulic clutch Cd, the number $N_L$ of rotations of the left front wheel $W_{FL}$ can be increased relative to the number $N_R$ of rotations of the right front wheel $W_{FR}$ in response to such reduction of the number of rotations of the carrier member 11, thereby transmitting any torque from the right front wheel $W_{FR}$, which is the inner wheel during turning of the vehicle, to the left front wheel $W_{FL}$, which is the outer wheel during turning of the vehicle.

Figure 8:
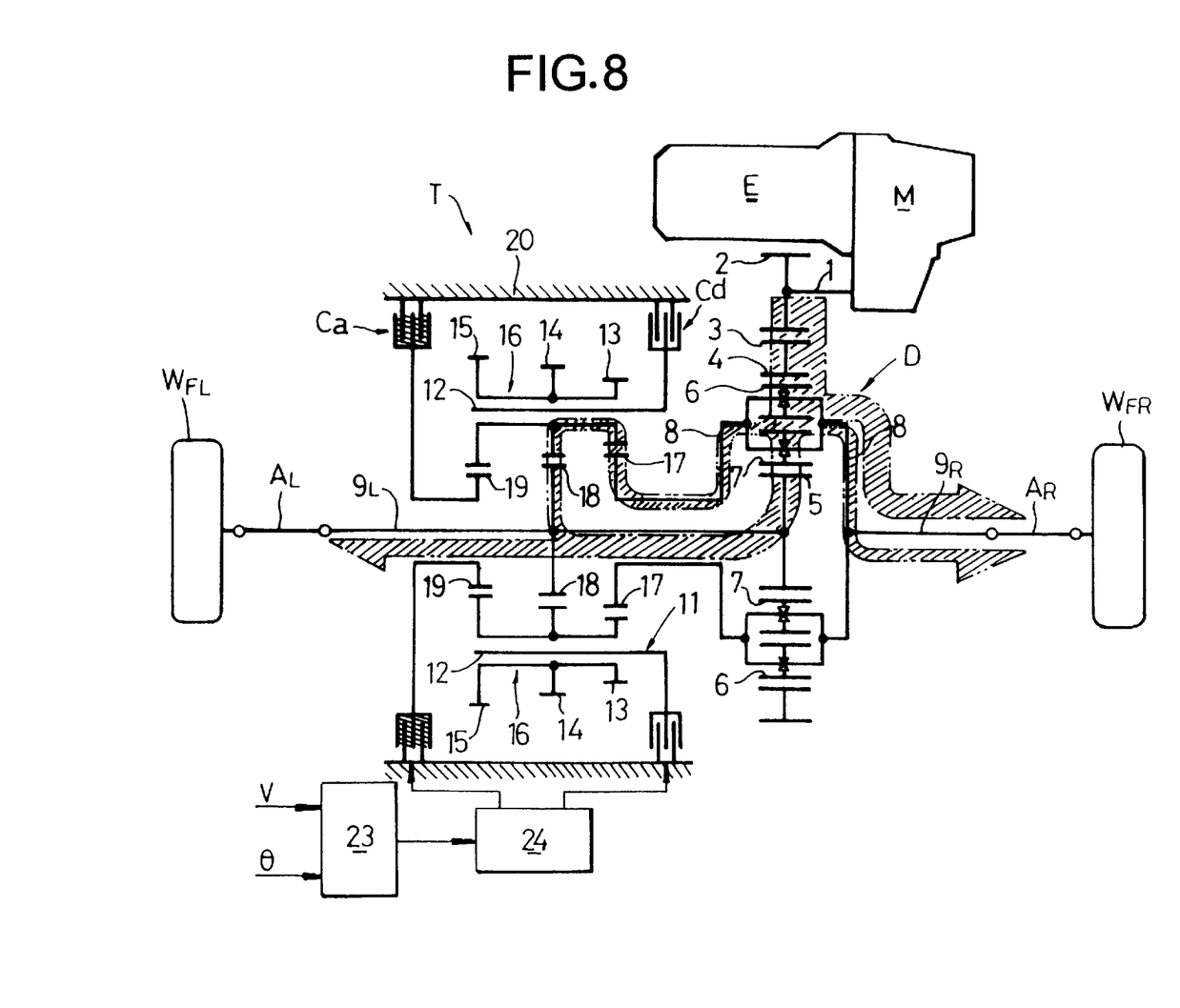
FIG. 8 is an illustration for explaining the operation of the power transmitting system of FIG. 1 during counterclockwise turning of the vehicle.

On the other hand, during counterclockwise turning of the vehicle, the speed-increasing hydraulic clutch Ca is brought into the engaged state through the electronic control unit 23 and the hydraulic circuit 24, as shown in FIG. 8, and the third pinion 15 is coupled to the casing 20 through the third sun gear 19. As a result, the number of rotations of the carrier member 11 is increased relative to the number of rotations of the left output shaft $9_L$, and the number $N_R$ of rotations of the right front wheel $W_{FR}$ is increased in a relation represented by the following equation relative to the number $N_L$ of rotations of the left front wheel $W_{FL}$.

$$N_R/N_L = \{1-(Z_5/Z_6)\times(Z_2/Z_1)\}/\{1-(Z_5/Z_6)\times(Z_4/Z_3)\} = 1.167 \qquad (2)$$

If the number $N_R$ of rotations of the right front wheel $W_{FR}$ is increased relative to the number $N_L$ of rotations of the left front wheel $W_{FL}$ in the above manner, a portion of the torque of the left front wheel $W_{FL}$, which is the inner wheel during turning of the vehicle, can be transmitted to the right front wheel $W_{FR}$, which is the outer wheel during turning of the vehicle, as shown by an obliquely lined arrow in FIG. 8. Even in this case, if the engage force of the speed-increasing hydraulic clutch Ca is properly regulated to increase the number of rotations of the carrier member 11, the number $N_R$ of rotations of the right front wheel $W_{FR}$ can be increased relative to the number $N_L$ of rotations of the left front wheel $W_{FL}$ in response to such increasing of the number of rotations of the carrier member 11, thereby transmitting any torque from the left front wheel $W_{FL}$, which is the inner wheel during turning of the vehicle, to the right front wheel $W_{FR}$, which is the outer wheel during turning of the vehicle.

As is apparent from the comparison of the equations (1) and (2) with each other, the increase rate (about 1.143) from the right front wheel $W_{FR}$ to the left front wheel $W_{FL}$ and the increase rate (about 1.167) from the left front wheel $W_{FL}$ to the right front wheel $W_{FR}$ can be substantially equalized to each other by setting the numbers of teeth of the first, second and third pinions 13, 14 and 15 and the first, second and third sun gears 17, 18 and 19 as described above.

If the increase rates represented by the equations (1) and (2) in addition to the setting of the numbers of teeth of the first, second and third pinions 13, 14 and 15 and the first, second and third sun gears 17, 18 and 19 so as to satisfy the above-described conditions, any distribution of the torque to between the left and right front wheels $W_{FL}$ and $W_{FR}$ under a usual travel condition of the vehicle can be achieved by regulating the engage forces of the speed-reducing hydraulic clutch Cd and the speed-increasing hydraulic clutch Ca. Thus, during traveling of the vehicle at a medium or lower speed, a torque larger than that to the inner wheel during turning of the vehicle can be transmitted to the outer wheel during turning of the vehicle to enhance the turning performance.

The suspension S according to the present embodiment is adapted to steer the front wheels $W_{FR}$ and $W_{FL}$ about the phantom king pin axis VK passing through the intersection a of the extensions of the lower arm 46 and the radius rod 49. Therefore, it is possible to define the phantom king pin axis VK in proximity to the tire 40 to possibly reduce the center offsets $OS_L$ and $OS_R$, while avoiding the interference of the tip end of the lower arm 46 and the radius rod 49 with the brake disks and the wheels 37 for the front wheels $W_{FL}$ and $W_{FR}$. Thus, it is possible to minimize the generation of a steering moment due to a difference between driving forces for the left and right front wheels $W_{FR}$ and $W_{FL}$.

Figure 9:
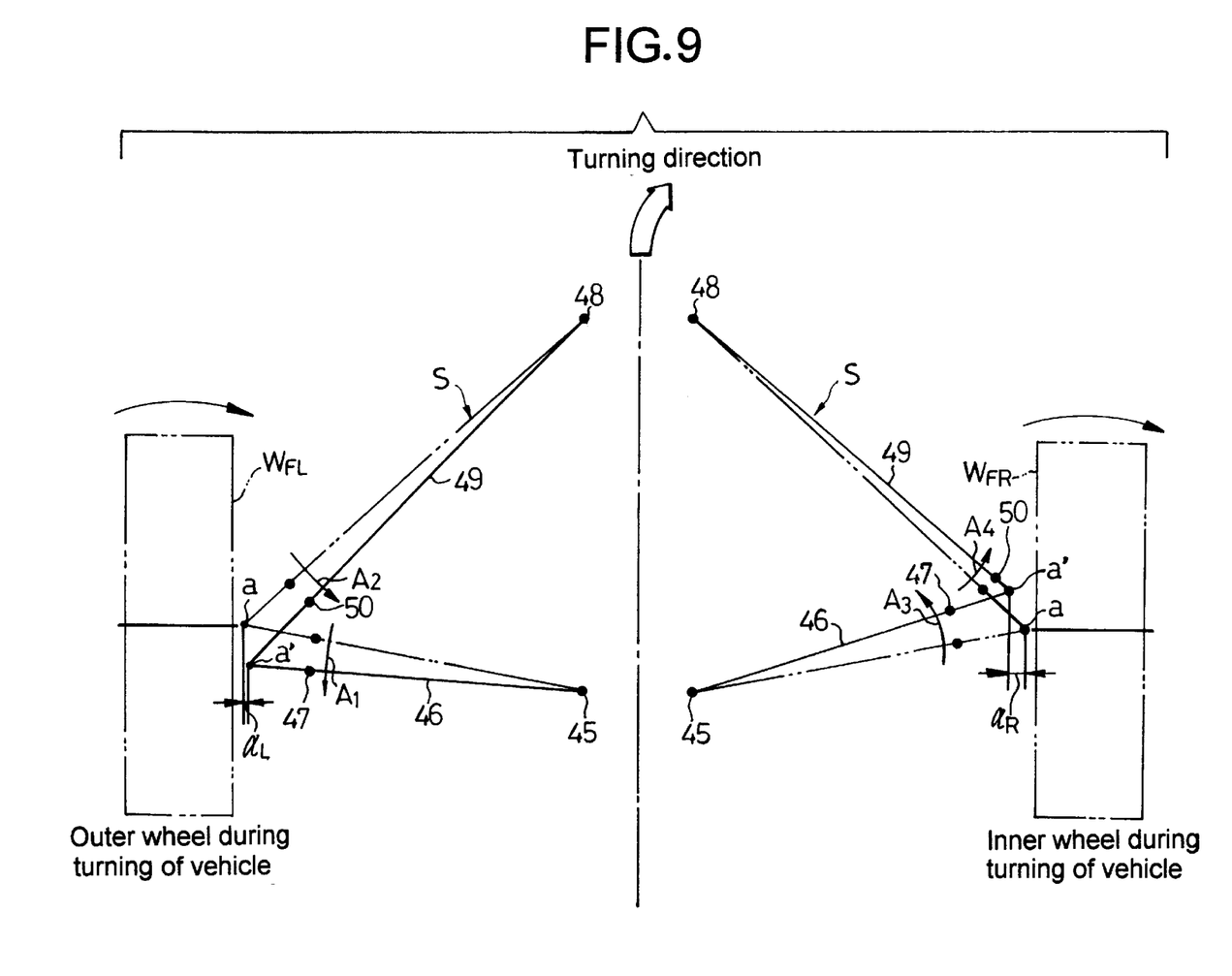
FIG. 9 is an illustration for explaining the changes in center offsets of outer and inner wheels during turning of the vehicle.

Further, when the vehicle performs a clockwise turning, as shown in FIG. 9, the left lower arm 46 and radius rod 49 are swung in directions of arrows $A_1$ and $A_2$, respectively, with rightward steering of the left front wheel $W_{FL}$, which is the outer wheel during turning of the vehicle. During this time, the intersection a (the point passing through the phantom king pin axis VK) of the extensions of the lower arm 46 and the radius rod 49 is moved rearwards of the vehicle body to a point a', but is little moved laterally of the vehicle body and moved inwards of the vehicle speed through a small distance $\alpha_L$. On the other hand, the right lower arm 46 and radius rod 49 are swung in directions of arrows $A_3$ and $A_4$, respectively, with rightward steering of the right front wheel $W_{FR}$, which is the inner wheel during turning of the vehicle. During this time, the intersection a of the extensions of the lower arm 46 and the radius rod 49 is moved forwards of the vehicle body to the point a' and moved inwards of the vehicle body through a relatively large distance $\alpha_R$.

If the position of the point a is moved inwards of the vehicle body in the above manner, as can be seen from FIG. 5, the position of the point c; namely, the position of the point c', is also moved inwards of the vehicle body and, hence, the center offsets $OS_L$ and $OS_R$ are increased. In this case, in the outer wheel during turning of the vehicle body, the center offset $OS_L$ is only slightly moved, because the amount $\alpha_L$ of point a moved inwards of the vehicle body is extremely small. However, in the inner wheel during turning of the vehicle, the center offset $OS_R$ is largely increased, because the amount $\alpha_R$ of point a moved inwards of the vehicle body is relatively large. Thus, the center offsets $OS_L$ and $OS_R$ of the left and right front wheels $W_{FL}$ and $W_{FR}$ are unbalanced.

Figure 10:
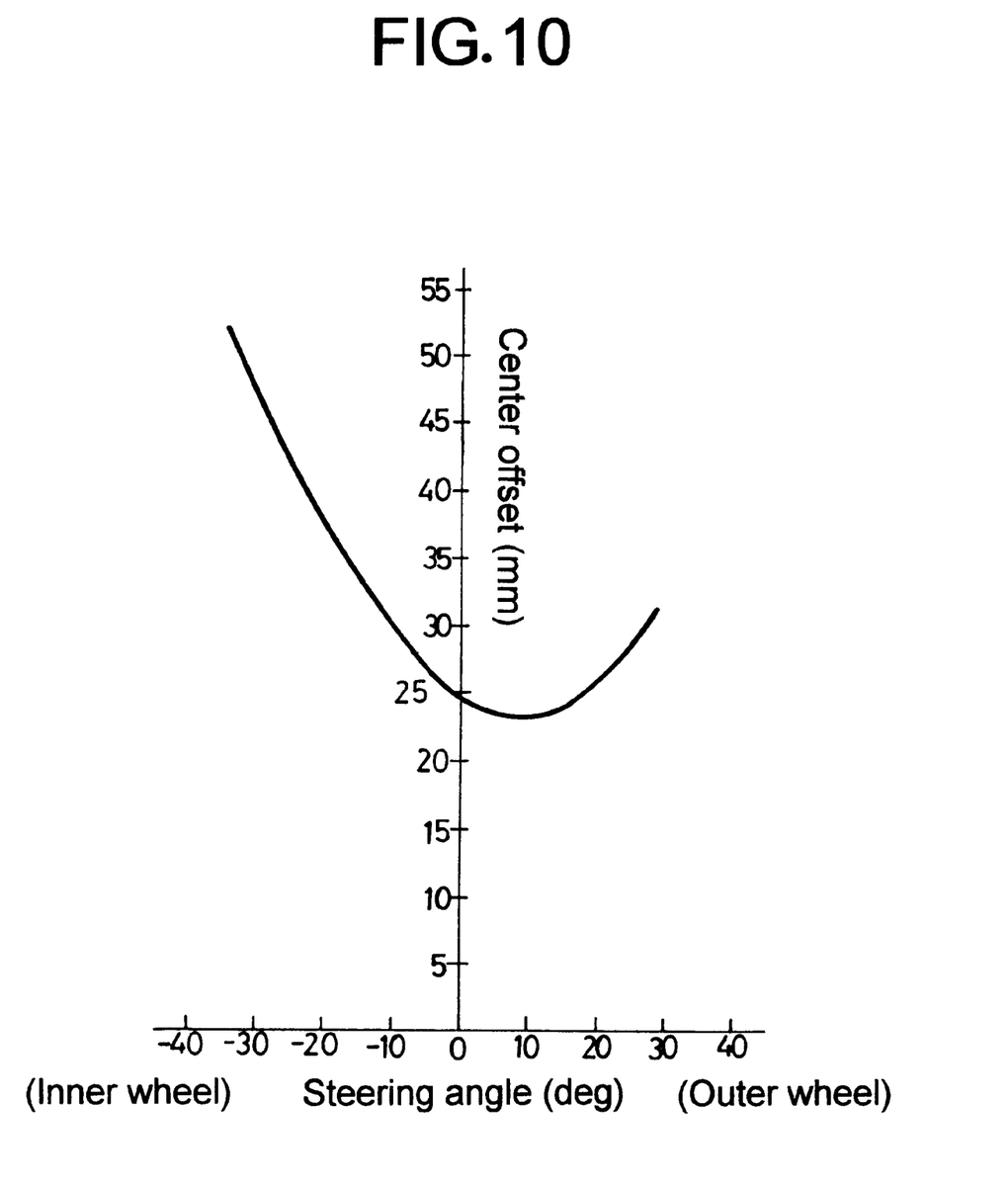
FIG. 10 is a graph illustrating a variation in center offset.

This will be described below with reference to a graph in FIG. 10. The center offset $OS_L$ of the outer wheel during turning of the vehicle is slightly decreased with an increase of the steering angle and, then, increased. For example, when the steering angle is 20°, the center offset $OS_L$ is increased from 24 mm at the steering angle of 0° to 26 mm. On the other hand, the center offset $OS_R$ of the inner wheel during turning of the vehicle is immediately increased with the steering. For example, when the steering angle is −20°, the center offset $OS_R$ is increased from 24 mm at the steering angle of 0° to 38 mm. In the graph in FIG. 10, the steering angle in the inward direction of the vehicle body is taken at a negative value, and the steering angle in the outward direction of the vehicle body is taken at a positive value.

In FIG. 11, the steering moment $M_L$ in the turning direction generated by the driving force $T_L$ applied to the outer wheel $W_{FL}$ during turning of the vehicle is provided according to $M_L = T_L \times OS_L$, and the steering moment $M_R$ in a direction opposite from the turning direction generated by the driving force $T_R$ applied to the inner wheel $W_{FR}$ during turning of the vehicle is provided according to $M_R = T_R \times OS_R$. Even if the driving force $T_L$ for the outer wheel $W_{FL}$ is increased and the driving force $T_R$ for the inner wheel during turning of the vehicle is decreased to enhance the turning performance during turning of the vehicle, the center offset $OS_L$ of the outer wheel $W_{FL}$ during turning of the vehicle is little increased, whereas the center offset $OS_R$ of the inner wheel $W_{FR}$ during turning of the vehicle is largely increased. Therefore, the steering moment $M_L$ in the turning direction and the steering moment $M_R$ in the direction opposite from the turning direction are substantially equalized to each other and effectively countervailed. Thus, even if the driving force is distributed to the left and right front wheels $W_{FR}$ and $W_{FL}$ during turning of the vehicle, the sum total of the steering moments $M_L$ and $M_R$ of the front wheels $W_{FR}$ and $W_{FL}$ can be prevented from being changed due to such distribution, thereby preventing the generation of the steering entraining phenomenon which has been described above.

The case in which the vehicle is turned clockwise has been described above, but even when the vehicle is turned counterclockwise, a similar function and effect is obtained.

The phantom king pin axis VK is formed by the two arms (the lower arm 46 and the radius rod 49) located below the knuckle 31 in the embodiment, but the upper arm 41 may be divided into two arms to form a phantom kin pin axis VK. Even in this case, if an intersection a of extensions of the two arms is moved inwards of the vehicle body, the center offsets $OS_L$ and $OS_R$ are increased, and if the intersection a is moved outwards of the vehicle body, the center offsets $OS_L$ and $OS_R$ are decreased (see FIG. 5). For this reason, it is necessary to dispose the connection point between the arm having the larger inclination angle with respect to the center line of the vehicle body and the knuckle 31 at an inner location in the vehicle body than the connection point between the arm having the smaller inclination angle with respect to the center line of the vehicle body and the knuckle 31.

Although the embodiment of the present invention has been described in detail, it will be understood that the present invention is not limited to the above-described embodiment, and various modifications in design may be made without departing from the subject matter and scope of the invention defined in claims.

For example, the case in which the steered wheels are the driven wheels has been illustrated in the embodiment, but the present invention is also applicable to a vehicle in which the steered wheels are follower wheels, and a driving force is distributed to one of the follower wheels, while a braking force is distributed to the other follower wheel. In addition, even if the positional relationship between the arm having the larger inclination angle with respect to the center line of the vehicle body and the arm having the smaller inclination angle with respect to the center line of the vehicle body is replaced longitudinally, a similar function and effect can be achieved.

What is claimed is:

1. A suspension system for steered left and right wheels in a vehicle body in which different driving forces or braking forces are distributed to said left and right wheels, respectively, said suspension system including means for suspending each of said wheels, comprising:

a knuckle mounting said wheel for rotation, at least two independent suspension arms, each having one end thereof pivotally connected to said vehicle body and the other end thereof pivotally connected to said knuckle, said suspension arms being angularly displaced with respect to each other whereby extensions of said suspension arms define a point of intersection, a phantom king pin axis passing through said point of intersection of said suspension arm extensions, and means for steering each of said wheels about said phantom king pin axis.

2. The suspension system for steered left and right wheels according claim 1, wherein a ground point of said wheel on a road surface is offset from a point of intersection of said phantom king pin axis with an axle of said wheel projected to said road surface in a longitudinal direction defining a center offset, and wherein, during steering of said wheels, said center offset for each said steered wheel is set such that the center offset of an outer wheel during turning of the vehicle.

3. A suspension system for steered wheels in a vehicle according to claim 2, wherein a point of connection between said knuckle and one of said two independent suspension arms having a larger inclination angle ($\theta_2$) with respect to a center line of the vehicle body is disposed in the vehicle body at an inner location than a point of connection between the knuckle and the other suspension arm having a smaller inclination ($\theta_1$) with respect to the center line of the vehicle body.

4. A suspension system for steered wheels in a vehicle according to claim 1, further including a device for generating a difference in the number of rotations between said right and left wheels, wherein the driving forces are distributed to said left and right wheels by said device.

5. A suspension system for steered wheels in a vehicle according to claim 1, wherein said two independent suspension arms are mounted to lower portions of said knuckle.

* * * * *